United States Patent
Takebe et al.

(10) Patent No.: US 6,731,951 B1
(45) Date of Patent: May 4, 2004

(54) PORTABLE WIRELESS EQUIPMENT

(75) Inventors: Hiroyuki Takebe, Ichikawa (JP); Masao Miyazaki, Chiba (JP); Itsuki Kouchi, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/543,556

(22) Filed: Apr. 5, 2000

(30) Foreign Application Priority Data

Apr. 20, 1999 (JP) .......................................... 11-112494

(51) Int. Cl.[7] ................................................. H04B 1/38
(52) U.S. Cl. ...................... 455/557; 455/574; 455/556.1
(58) Field of Search ................................ 455/571, 572, 455/573, 574, 575, 403, 407, 408, 556, 557, 404

(56) References Cited

U.S. PATENT DOCUMENTS

| | | | |
|---|---|---|---|
| 3,644,681 A | * 2/1972 | Rice | 455/462 |
| 4,939,770 A | * 7/1990 | Makino | 455/127 |
| 5,020,090 A | 5/1991 | Morris | |
| 5,201,066 A | * 4/1993 | Kim | 455/185.1 |
| 5,278,893 A | 1/1994 | Voser et al. | |
| 5,590,417 A | 12/1996 | Rydbeck | |
| 5,661,780 A | * 8/1997 | Yamamoto et al. | 455/573 |
| 5,745,849 A | * 4/1998 | Britton | 455/404 |
| 5,926,756 A | * 7/1999 | Piosenka et al. | 455/418 |
| 5,943,627 A | 8/1999 | Kim et al. | 455/569 |
| 5,983,100 A | * 11/1999 | Johansson et al. | 455/426.1 |
| 6,067,583 A | * 5/2000 | Gilbert | 455/1 |
| 6,085,112 A | * 7/2000 | Kleinschmidt et al. | 455/556 |
| 6,128,510 A | * 10/2000 | Beukema et al. | 455/557 |
| 6,208,867 B1 | * 3/2001 | Kobayashi | 379/56.3 |
| 6,223,029 B1 | * 4/2001 | Stenman et al. | 455/420 |
| 6,324,380 B1 | * 11/2001 | Kiuchi et al. | 455/12.1 |
| 6,330,244 B1 | * 12/2001 | Swartz et al. | 370/329 |
| 6,496,498 B1 | * 12/2002 | Kockmann et al. | 370/347 |
| 6,501,939 B1 | * 12/2002 | Dent | 455/11.1 |

FOREIGN PATENT DOCUMENTS

| | | |
|---|---|---|
| CN | 1176569 A | 3/1998 |
| EP | 0629071 A1 | 12/1994 |
| EP | 0643518 A1 | 3/1995 |
| JP | 63-39218 A | 2/1988 |
| JP | 4-196626 A | 7/1992 |
| JP | 2503906 B2 | 4/1996 |
| JP | 2993087 B2 | 10/1999 |

* cited by examiner

*Primary Examiner*—Congvan Tran
(74) *Attorney, Agent, or Firm*—Birch, Stewart, Kolasch & Birch, LLP

(57) ABSTRACT

An object of the present invention is to provide a portable terminal suitable for a videophone using a multicall and a portable wireless equipment which communicate voice and data at the same time, and which is small and thin and has excellent portability, without being affected by a human body, at the time of conversation.

Therefore, a radio unit which requires large power for the communication with the base station and hence is difficult to be made small and a user interface unit which is actually operated by a user are separated, and connected by radio communication with small power.

37 Claims, 10 Drawing Sheets

PORTABLE WIRELESS EQUIPMENT

BACKGROUND OF THE INVENTION

1. Field of the Invention

The present invention relates to portable wireless equipment such as a portable wireless phone for transferring voice, data, etc.

2. Description of the Prior Art

Recently, various mobile communications using semi-micro wave have been spotlighted, and because of its portability, a small and thin radio terminal which can be used for a long period of time is desired. Moreover, as the applications to be used, communications covering wide range of not only voice, but also data, image and the like is desired.

First, an example of a conventional portable wireless equipment PH is shown in FIG. 1. FIG. 1 shows one example of a portable telephone used exclusively for voice, which has an unillustrated radio section, a control section composed of CPU, memory or the like, and an unillustrated built-in antenna for diversity in a housing 91 formed of resin; a user interface section composed of a microphone 92, a receiver 96, a liquid crystal display screen 93, keys 94, etc. and an external antenna 95 on the outside face of the housing 91; and a battery containing section 97 on the back face of the housing 91.

FIG. 2 shows an example of a case where data communication is performed by using a conventional portable wireless equipment PH which is capable of data transmission.

A notebook type personal computer 101 (hereinafter abbreviated as "PC") for data communication is connected to the portable wireless equipment PH shown in FIG. 1, via a data communication modem card 103 in a card shape inserted into a PC card slot 102 and a cable 104.

The data received by the portable wireless equipment PH is transmitted to the PC via a data communication modem (modulator demodulator) 103, and on the contrary, data from the PC 101 is transmitted to an unillustrated base station via the portable wireless equipment PH. At this time, the portable wireless equipment PH operates as one for performing data only communication between the base station and the PC 101, and performing communication control such as call-out and call-in.

Such a portable wireless equipment PH is desired to be made small and thin, due to the portability.

However, a built-in antenna having relatively large-sized parts and RF (Radio Frequency) filter and the like are present in the aforesaid portable wireless equipment PH.

Moreover, a battery for driving is required to have a large capacity so that the portable wireless equipment PH can be used for a long period of time, and therefore a large-sized battery is used. Due to these factors, it cannot be desired to make the portable wireless equipment PH small and thin rapidly.

Furthermore, at the time of using the portable wireless equipment (at the time of communication), since the portable wireless equipment PH is applied to the ear and used, the transmitting and receiving antenna 95 operates in the vicinity of the head of a human body acting as a very lossy body. Therefore radiation characteristics of the antenna are greatly deteriorated to thereby deteriorate the communication quality.

On the other hand, when data communication is performed using the portable wireless equipment PH, since it is necessary to connect it to the PC 101 via the cable 104, complicated operation such as cable connection or the like becomes necessary to perform data communication. Also, since the portable wireless equipment PH and the PC 101 are present away from each other, it is not suitable for mobile applications.

There is also a case where the portable wireless equipment PH is directly inserted to the PC 101, but in this case, a radio modem capable of connecting with the PC 101 is required in the portable wireless equipment PH, hence it is not suitable for making the portable wireless equipment PH small.

As described above, when data communication is performed, since the PC 101 and the portable wireless equipment PH are connected, it is required to connect an earphone microphone jack or the like, when data and voice are communicated at the same time by means of a multicall or the like, or in the case of a videophone using the portable wireless equipment PH.

SUMMARY OF THE INVENTION

With a view to solving the above-described problems, it is an object of the present invention to provide a portable terminal suitable for a videophone using a multicall for communicating voice and data at the same time and a portable wireless equipment, which is small and thin, excellent in portability, and can be used for a long period of time, and is less affected by a human body.

To attain the above-described object, the gist of the present invention is constituted as described below.

A first gist of the present invention is a portable wireless equipment having a radio unit section for performing radio communications of communication information with a base station, and a user interface unit section comprising an input/output interface used for the radio communications by an operator, wherein the radio unit section comprises a first radio communication section used for radio communications with the base station, a second radio communication section used for radio communications with the user interface unit section, a radio unit control section for controlling the first and second radio communication sections, and a first power supply section for driving the radio unit section, and the user interface unit section comprises a third radio communication section used for radio communications with the radio unit section, with less power than the first radio communication section, a user interface unit control section for controlling the third radio communication section and the input/output interface, and a second power supply section for driving the user interface unit section, using less power or being smaller than the first power supply section, the user interface unit section being capable of being separated from the radio unit section for performing radio communications.

A second gist of the present invention is a portable wireless equipment according to the first gist wherein the radio unit section and the user interface unit section are constructed detachably.

A third gist of the present invention is a portable wireless equipment according to the first or second gist, wherein the radio unit has a communication modem capable of connecting the radio unit section with an image data processing apparatus which can display images or data.

A fourth gist of the present invention is a portable wireless equipment according to the first or second gist, wherein the radio unit section has a first electric contact portion, and the user interface unit section has also a second electric contact portion, and when the radio unit section and the user interface unit section are combined into one, the first and second contact portions are connected.

A fifth gist of the present invention is a portable wireless equipment according to the third gist, wherein the radio unit section has a first electric contact portion, and the user interface unit section has also a second electric contact portion, and when the radio unit section and the user interface unit section are combined into one, the first and second contact portions are connected.

A sixth gist of the present invention is a portable wireless equipment according to the fourth gist, wherein the first and second contact portions include a power supply line, and when the radio unit section and the user interface unit section are combined into one, the user interface unit section is driven by the first power supply section in the radio unit section.

A seventh gist of the present invention is a portable wireless equipment according to the fifth gist, wherein the first and second contact portions include a power supply line, and when the radio unit section and the user interface unit section are combined into one, the user interface unit section is driven by the first power supply section in the radio unit section.

An eighth gist of the present invention is a portable wireless equipment according to the fourth or sixth gist, wherein the first and second contact portions include a power supply line, and when the radio unit section and the user interface unit section are combined into one, a second power supply section in the user interface unit section is charged by the first power supply section in the radio unit section.

A ninth gist of the present invention is a portable wireless equipment according to the fifth or seventh gist, wherein the first and second contact portions include a power supply line, and when the radio unit section and the user interface unit section are combined into one, a second power supply section in the user interface unit section is charged by the first power supply section in the radio unit section.

A tenth gist of the present invention is a portable wireless equipment according to the first or second gist, wherein the radio unit section is built in an image data processing apparatus beforehand, which can display an image or data.

An eleventh gist of the present invention is a portable wireless equipment according to the third gist, wherein the radio unit section is built in an image data processing apparatus beforehand, which can display an image or data.

According to the first gist of the present invention, the communication information from the base station is received by the first radio communication section, thereafter transmitted to the second radio communication section under the control of the radio unit control section, and transmitted by radio from the second radio communication section toward the user interface unit section. Then, the user interface unit section receives the communication information by the third radio communication section which performs radio communications with less power than the first radio communication section, and thereafter, the communication information is transmitted to the input/output interface under the control of the user interface unit control section. Thus, an operator can obtain communication information via the input/output interface.

On the contrary, communication information from the operator side is input by using the input/output interface, and transmitted by less power radio toward the radio unit section from the third radio communication section which performs radio communications with less power than the first radio communication section, under the control of the user interface unit control section. The communication information is then received by the second radio communication section, and transmitted to the first radio communication section under the control of the radio unit control section, and then transmitted to the base station.

Since the portable wireless equipment is made separable between the radio unit section and the user interface unit section, an operation section which is operated by an operator by hand is only the user interface unit section. Hence, this section can be made smaller than a conventional portable wireless equipment, having excellent portability.

Particularly, by separating the user interface unit section which does not require large power from the radio unit section, the second power supply section in the user interface unit section which is operated by the operator by hand can be made less powerful or smaller than the first power supply section in the radio unit section which requires large power, enabling to make the user interface unit section small, thin, and lightweight.

Moreover, since a high-performance radio set required for communication with the base station is not necessary between the radio unit section and the user interface unit section which communicate by radio in a short distance, the third radio communication section which performs radio communications with less power than the first radio communication section (uses the second power supply section) is provided in the user interface unit section. Hence, it becomes possible to make the user interface unit section small, thin and lightweight, while ensuring the radio communication function.

As described above, the small-sized user interface unit section which is actually operated by the operator can be made small, thin and lightweight which can be used, for example, for operation or for transmission and reception, or can be carried in a chest pocket, hence it becomes possible to provide a portable wireless equipment desired by the operator.

Moreover, by separating the radio unit section and the user interface unit section for radio communications, the first radio unit section having a high-performance antenna which is essential for high quality radio communications with the base station is not put close to the head of a human body at the time of conversation, hence a high-performance antenna can be realized at the time of actual use.

Meanwhile, even when the first power supply section in the radio unit section is made to have a large capacity for longer use, though the radio unit section carried in a bag or the like is made slightly bigger, the size of the user interface unit section which is actually used does not change, hence the portability is not impaired.

According to the second gist of the present invention, the radio unit section and the user interface unit section are detachably constructed, hence usage of the portable wireless equipment as a normal portable wireless equipment and a selective application mode become possible, thereby improving the handleability.

According to the third gist of the present invention, when the voice and data or an image are communicated at the same time, it becomes possible to communicate while watching the data of the image processing apparatus connected to the radio unit section, during conversation using the user interface unit section.

According to the fourth or fifth gist of the present invention, when the radio unit section and the user interface unit section are combined into one, the first and second contact portions are connected, hence a selective application mode becomes possible to use it as a normal portable wireless equipment or to use it by separating them, thereby improving the handleability.

According to the sixth or seventh gist of the present invention, the first and second contact portions include a power supply line, and when the radio unit section and the user interface unit section are combined into one, the user interface unit section is driven by the first power supply section, thereby the consumption of the second power supply section having small power can be suppressed at the time of being combined.

According to the eighth or ninth gist of the present invention, the first and second contact portions include a power supply line, and when the radio unit section and the user interface unit section are combined into one, the second power supply section is charged by the first power supply section, thereby the power consumption of the second power supply section having small power can be supplemented.

According to the tenth or eleventh gist of the present invention, the radio unit section is beforehand built in the image data processing apparatus, hence voice and data or images can be communicated at the same time, and it becomes also possible to communicate while watching the data or image displayed on an image data communication section, during conversation using the user interface unit section, without using an earphone jack or the like.

DESCRIPTION OF THE PREFERRED EMBODIMENTS

Below is a description of embodiments of the present invention with reference to the drawings.

Figure 3:
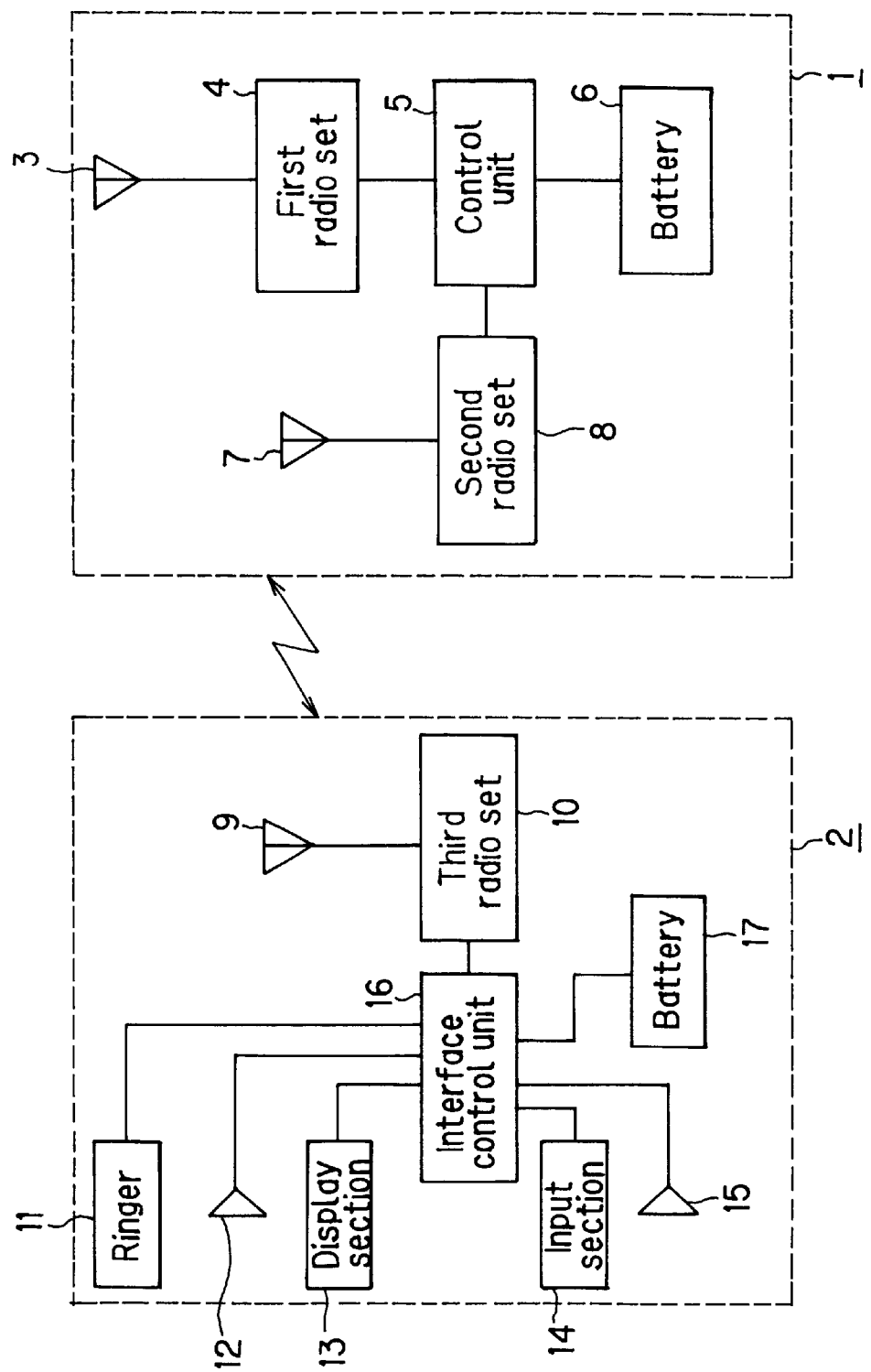
FIG. 3 is a schematic block diagram of portable wireless equipment according to a first embodiment of the present invention.

FIG. 3 is a schematic block diagram of portable wireless equipment according to a first embodiment of the present invention. The portable wireless equipment in FIG. 3 has a radio unit 1 for communicating data, images, voice and the like by radio with a base station, and a user interface unit 2 separately provided with respect to the radio unit 1.

The radio unit 1 has a first radio set 4 for performing radio communications with an unillustrated base station, a first antenna 3 connected to the first radio set 4, a second radio set 8 for performing radio communications with the user interface unit 2 with small power, a second antenna 7 connected to the second radio set 8, a control unit 5 constituted by a CPU, a memory and the like, for controlling the first and second radio sets 4, 8, and a battery 6 for driving the control unit 5 and the first and second radio sets 4, 8.

The user interface unit 2 has a display section 13 constituted by a liquid crystal screen and an input section 14 such as keys or the like, as an input/output interface operated or referred by a user for performing communications, a microphone 15 and a receiver 12 for performing transmission and reception, a ringer 11 for informing arrival of a call, a third radio set 10 for performing radio communications with small power, an interface control unit 16 constituted by a CPU, a memory or the like for controlling the interface and the third radio set 10, a third antenna 9 connected to the third radio set 10, and a battery 17.

The first antenna 3 and the first radio set 4 perform radio communications such as voice, data, communication control signals and the like with the base station, similarly as the above-described conventional portable telephone PH. Of the communication signals, user signals to be informed to the user, such as voice, data, call-in and call-out signals and the like are communicated by radio between the second antenna 7 in the radio unit 1 and the third antenna 9 in the user interface unit 2 with small power, and then transmitted to the display section 13, the ringer 11, the receiver 12 and the like.

Since it is necessary that the radio unit 1 is provided with a large-power transmitter, a high-performance filter and a high-performance antenna for performing public radio communications with the base station in a long distance, the radio unit 1 comprises a relatively large battery, filter and antenna. Therefore, the radio unit 1 has a relatively large size or thickness as a whole.

However, the user interface unit 2 performs radio communications with the radio unit 1 in a short distance, hence it has only to have a built-in small power radio set for communications. Therefore, the radio section can be constituted very simply, and since the output thereof is small, a very small battery can be used as a battery 17 serving as the power supply. Hence, it is possible to make the user interface unit 2 very small or thin, compared to radio unit 1.

When the above-described portable wireless equipment is normally used, the radio unit 1 is contained in a bag or the like, and operation and communication of voice, data or the like can be performed with only the user interface unit 2, enabling improvement of the portability which is desired by users, and to have excellent handleability.

Moreover, since the radio unit 1 is not used in the vicinity of the head at the time of use, the first antenna 3 which requires high performance does not adjoin the lossy body (the head of a human body), thereby enabling to realize high performance of the antenna properties at the time of actual use. Also, even when the first battery 6 is made large (the capacity of the first battery 6 is increased), and the radio unit 1 having the highest power consumption can be used for a long period of time, though the size of the radio unit 1 slightly increases, it can be contained in a bag or the like, as described above, and the size of the user interface unit 2 which is actually contained in a breast pocket or the like, and used by a user at the time of communication does not change, hence the portability is not impaired.

Figure 4:
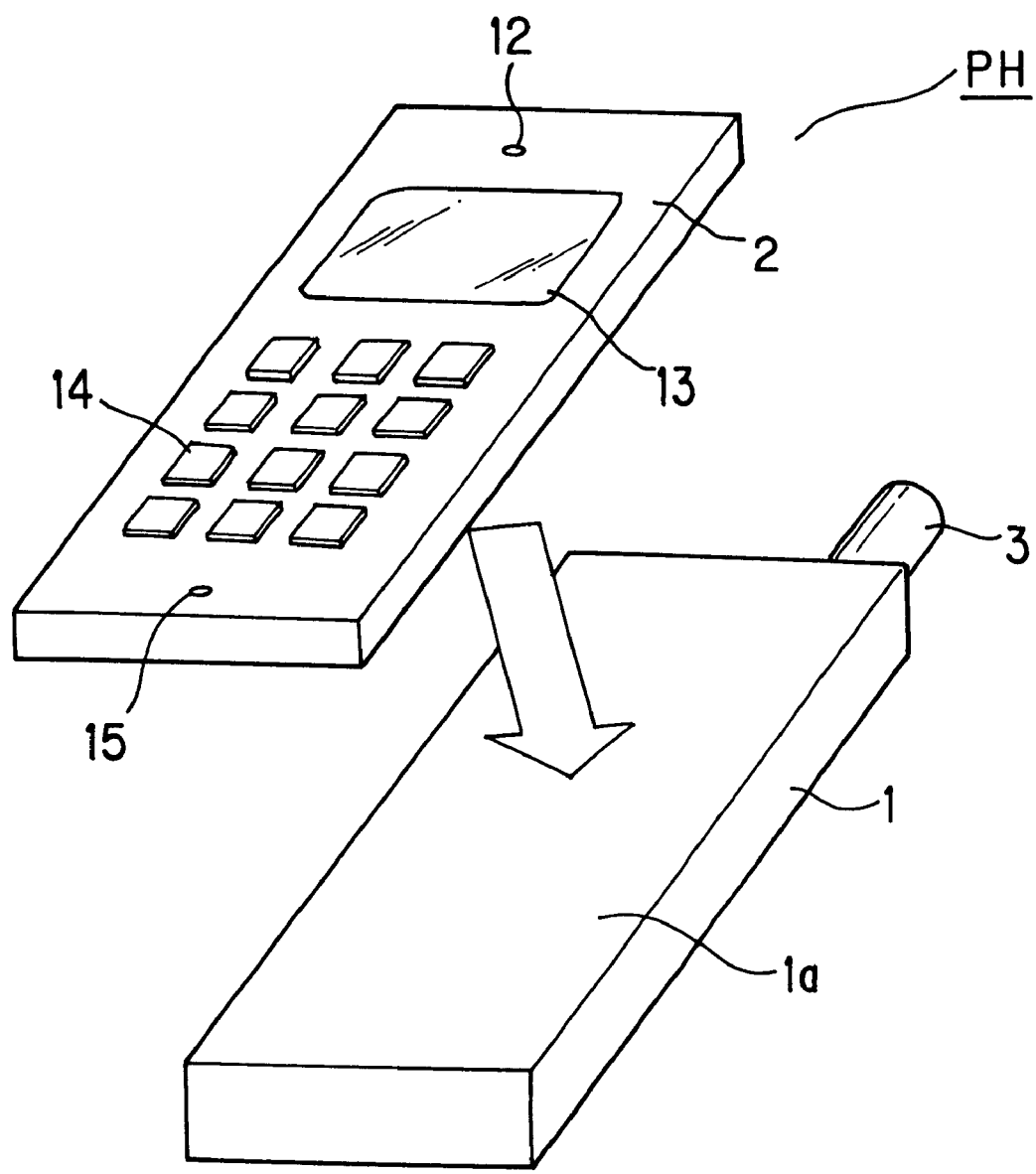
FIG. 4 is a perspective view of a portable wireless equipment according to a second embodiment of the present invention.

FIG. 4 is a perspective view of a portable wireless equipment according to a second embodiment of the present invention. The same construction as in the above embodiment is denoted by the same reference numeral and the description thereof is omitted.

A portable wireless equipment shown in FIG. 4 has a user interface unit 2 and a radio unit 1 detachably constructed, and both units have a thin box shape, respectively, where the detachable floor face has roughly the same rectangular shape. As in the first embodiment, the radio unit 1 has unillustrated first and second radio sets 4, 8, control unit 5, second antenna 7 and first battery 6 and a first antenna 3 (FIG. 3), and the user interface unit 2 is provided with an unillustrated third radio set 10, interface control unit 16, third antenna 9 and second battery 17, and a liquid crystal screen 13 as an interface operated or referred by a user for performing communication, keys 14, a microphone 15 and a receiver 12 for performing transmission and reception, on the operation plane (FIG. 3).

The first antenna 3 used for the radio communications with an unillustrated base station is mounted to a housing of the radio unit 1 so that it can be drawn out to outside or contained therein. On the other hand, the second and third antennas 7 and 9 for transmitting and receiving user signals with small power are built in the housing of the radio unit 1 and the housing of the user interface unit 2, respectively.

The second antenna 7 is built in the radio unit 1 on the side of the face 1a attached to the user interface unit 2, and the third antenna 3 is also built in the user interface unit 2 on the side of the face 1a attached to the radio unit 1.

When the portable wireless equipment of the second embodiment having the above-described construction is normally used, the radio unit 1 and the user interface unit 2 are separated, and the radio unit 1 is contained in a bag or the like, and voice and data communication becomes possible with only the user interface unit 2. In addition, when there is no space for containing the radio unit 1 such as a bag or the like, the user interface unit 2 and the radio unit 1 can be combined into one to be used and stored, thus increasing the handleability. At this time, since the second and third antennas are respectively built in on the closer face side, when they are put close to each other, respective units are electrically connected by means of the. electromagnetic coupling, enabling similar use as the conventional portable telephone.

Figure 5:
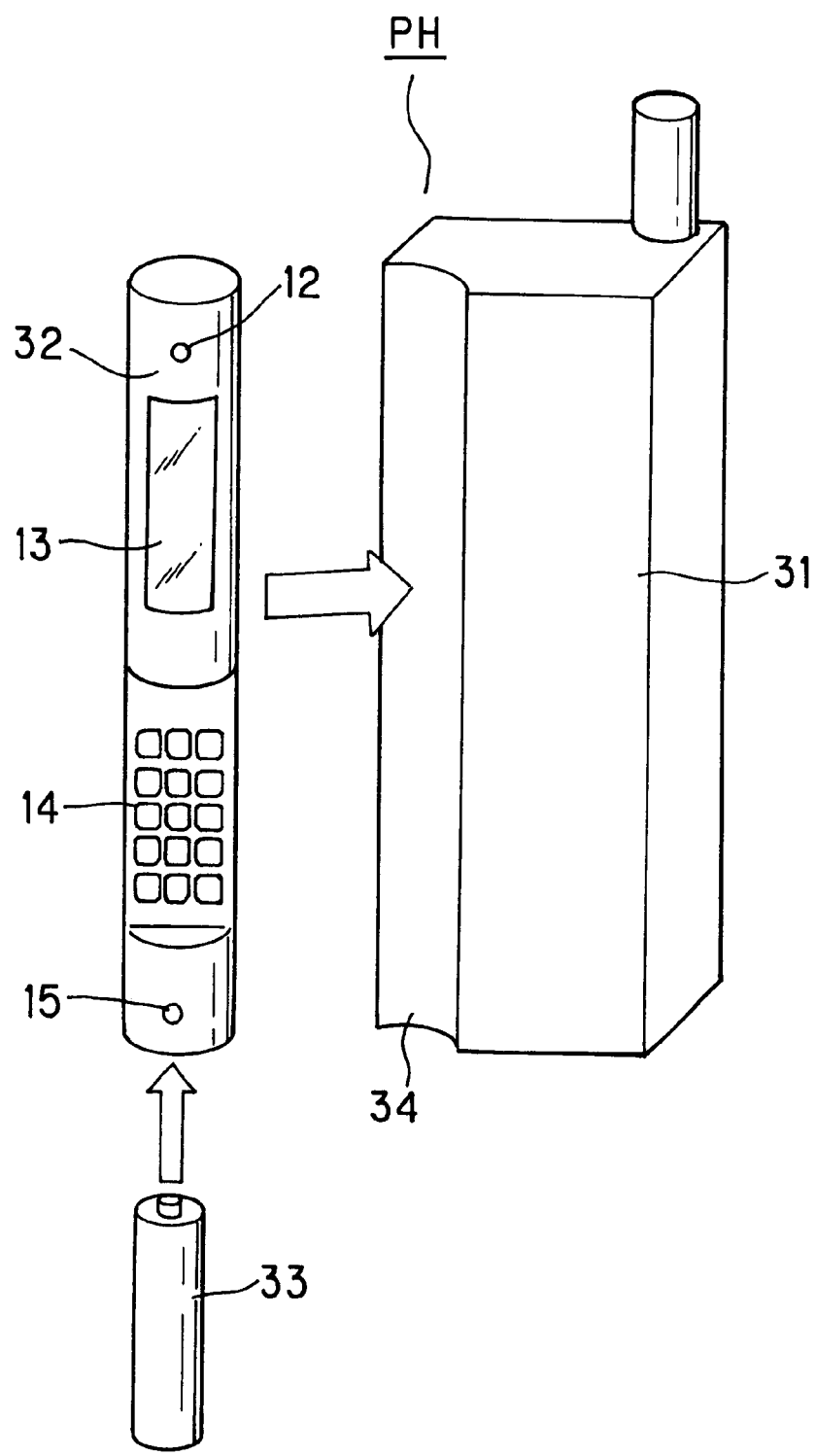
FIG. 5 is a perspective view of a portable wireless equipment according to a third embodiment of the present invention.

FIG. 5 is a perspective view of a portable wireless equipment according to a third embodiment of the present invention. The same construction as in the above embodiment is denoted by the same reference numeral and the description thereof is omitted.

A portable wireless equipment PH shown in FIG. 5 has a radio unit 31 in a box shape for performing radio communications with the base station, and a user interface unit 32 having a pen shape to give a circular shape in cross-section, which is detachably provided to the radio unit 31, so that at the time of combining respective units 31 and 32 into one, the user interface unit 32 can be contained intimately in an arc-shaped concave portion 34 provided in the radio unit 31 towards the longitudinal direction. The internal construction of the radio unit 31 and the user interface unit 32 is the same as that of the above-described radio unit 1 and user interface unit 2, hence the description thereof is omitted.

According to this embodiment, since the user interface unit 32 is in a pen shape, it can be favorably contained in a chest pocket or the like, and commercially available AA or AAA dry batteries 33 can be used. Hence, correspondence to a case where the battery is dead becomes easy, and handleability of the portable wireless equipment can be improved.

Figure 6:
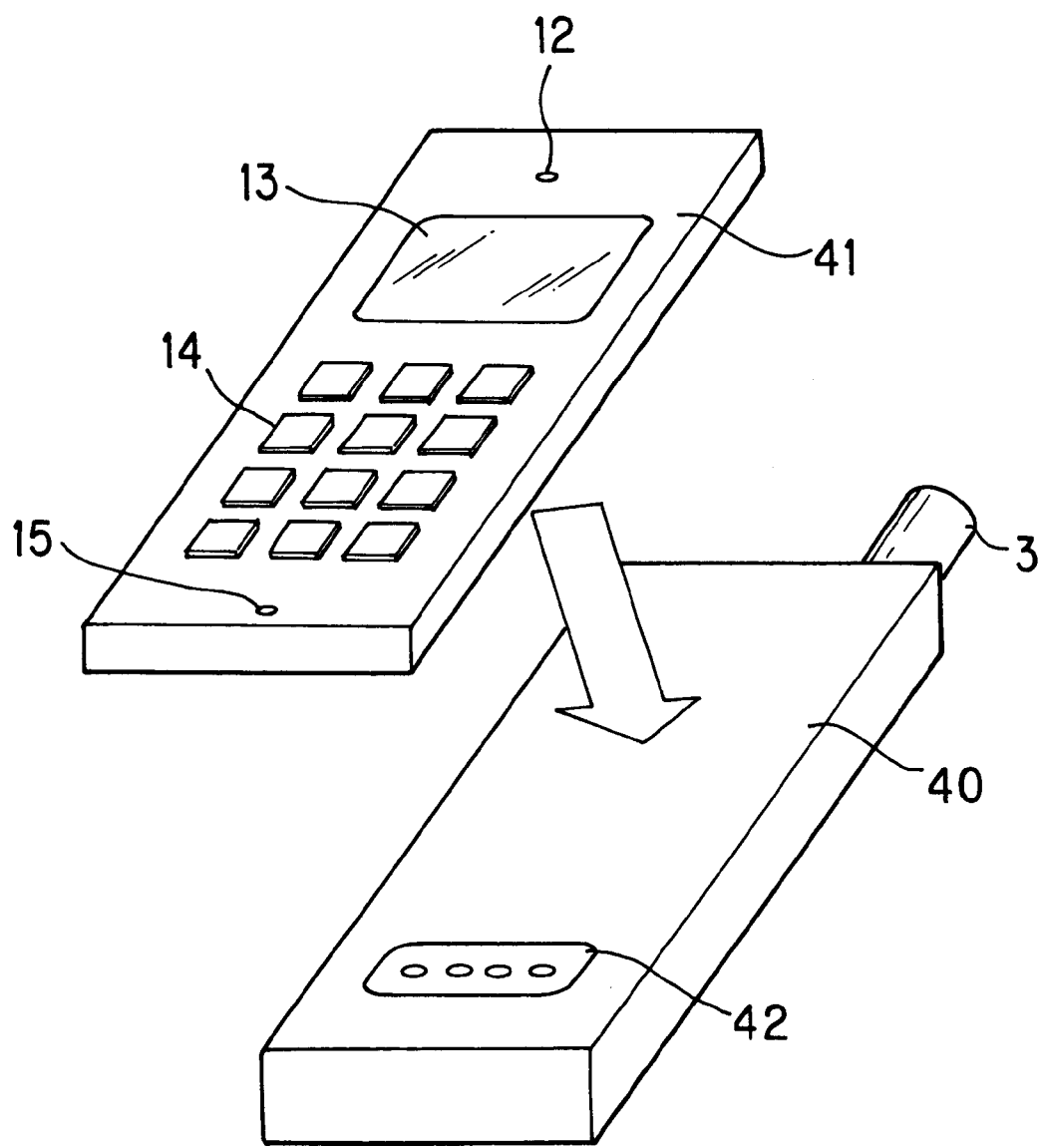
FIG. 6 is a perspective view of a portable wireless equipment according to a fourth embodiment of the present invention.
Figure 7:
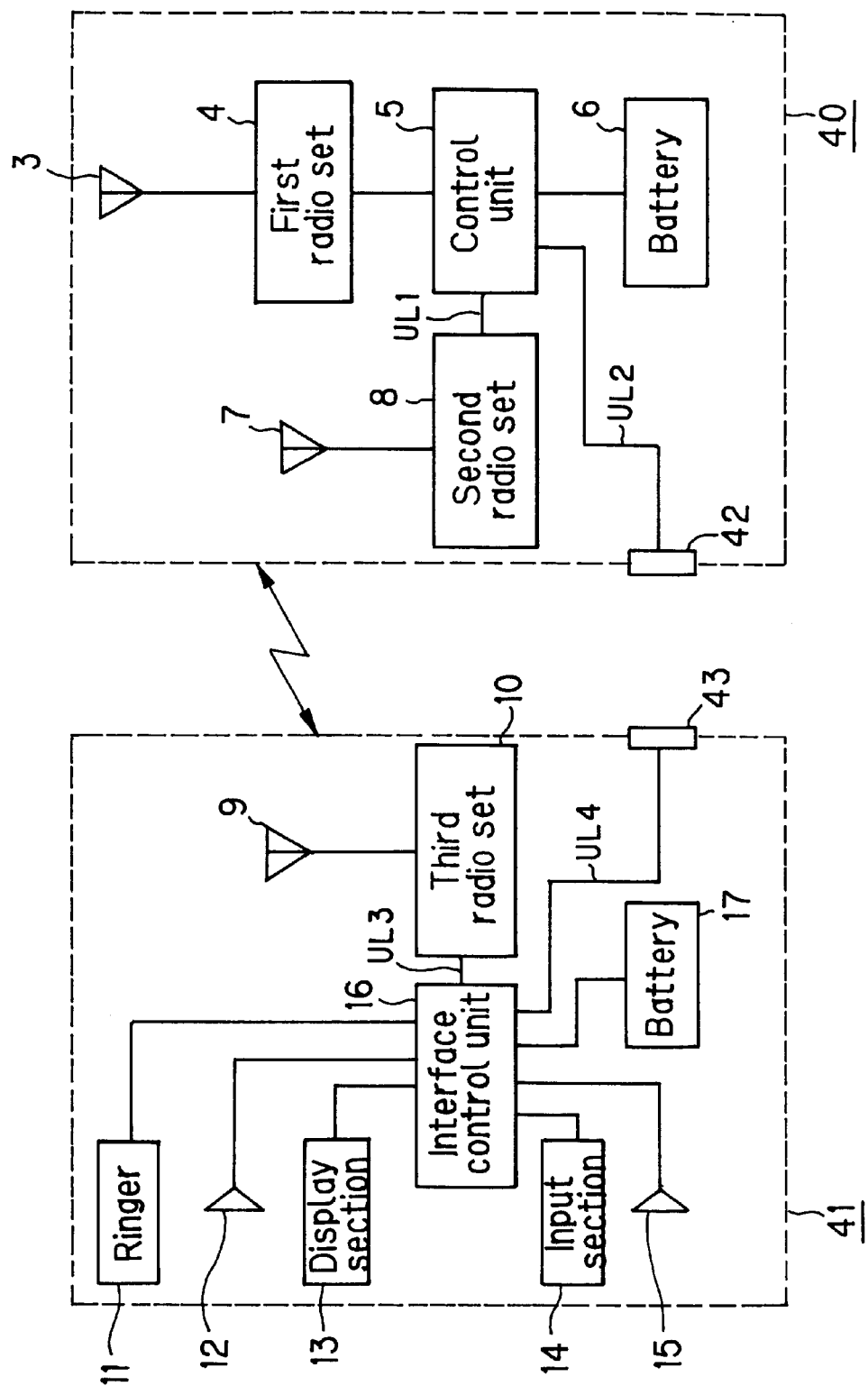
FIG. 7 is a schematic block diagram of a portable wireless equipment according to a fourth embodiment of the present invention.

FIG. 6 is a perspective view of a portable wireless equipment according to a fourth embodiment of the present invention. Also, FIG. 7 is a schematic block diagram of the portable wireless equipment shown in FIG. 6. The same construction as in the above embodiments is denoted by the same reference numeral, and the description thereof is omitted.

The portable wireless equipment in this embodiment is such that, in the portable wireless equipment of the second embodiment described above, when the radio unit and the user interface unit are combined into one, they are connected not by the electromagnetic coupling, but by a connection interface 42.

As shown in FIG. 7, a user signal line UL1 connected to the control unit 5 in the radio unit 40 is connected to a second radio set 8, and a user signal line UL2 is connected to a first contact terminal 42. Similarly, a user signal line UL3 connected to the user interface control unit 16 in the user interface unit 41 is connected to a third radio set 10, and a user signal line UL4 is connected to a second contact terminal 43.

The first contact terminal 42 and the second contact terminal 43 are, as shown in FIG. 6, provided in a position connected to each other, when the radio unit 40 and the user interface unit 41 are combined into one, opposing to each other so that communications are possible.

When the radio unit 40 and the user interface unit 41 are combined into one, if the first and second contact terminals 42, 43 are brought into contact with each other, at the same time, the above-described user signal UL1 from the control unit 5 in the radio unit 40 to the second radio set 8, and the user signal UL3 from the interface control unit 16 in the user interface unit 41 to the third radio set 10 are shut off. On the other hand, the control unit 5 in the radio unit 40 and the user interface control unit 16 in the user interface unit 41 are directly connected via the first and second contact portions 42, 43.

According to this embodiment, the user signal lines UL2 and UL4 are directly connected when the radio unit 40 and user interface unit 41 are combined into one, hence there is no need for the second and third antennas 7, 9 to be brought close to each other at the time of combining the radio unit 40 and the user interface unit 41, and the degree of freedom in the arrangement design of the antennas 7, 9 in the radio unit 40 and the user interface unit 41 can be increased.

Moreover, the power supply line from the first battery 6 is included in the first and second contact terminals 42, 43, enabling to drive the user interface unit 41 by using the battery 6 having large capacity in the radio unit 40 at the time of combining the radio unit 40 and the user interface unit 41 into one. Hence, even if the second battery 17 in the user interface unit 41 is dead, the user interface unit 41 can be used, and the-power consumption of the battery 17 can be also suppressed.

Furthermore, by providing a circuit for charging in the user interface unit 41 or in the radio unit 40, it becomes possible to charge the second battery 17 in the user interface unit 41 by means of the first battery 6 having large capacity in the radio unit 40, at the time of combining the both units 40, 41 into one. Therefore, it becomes possible to use a chargeable small, thin battery charger without using a dry battery 33 (FIG. 5) as a power supply, enabling to increase the degree of freedom in the design matter and to make the user interface unit 41 small and thin.

Figure 8:
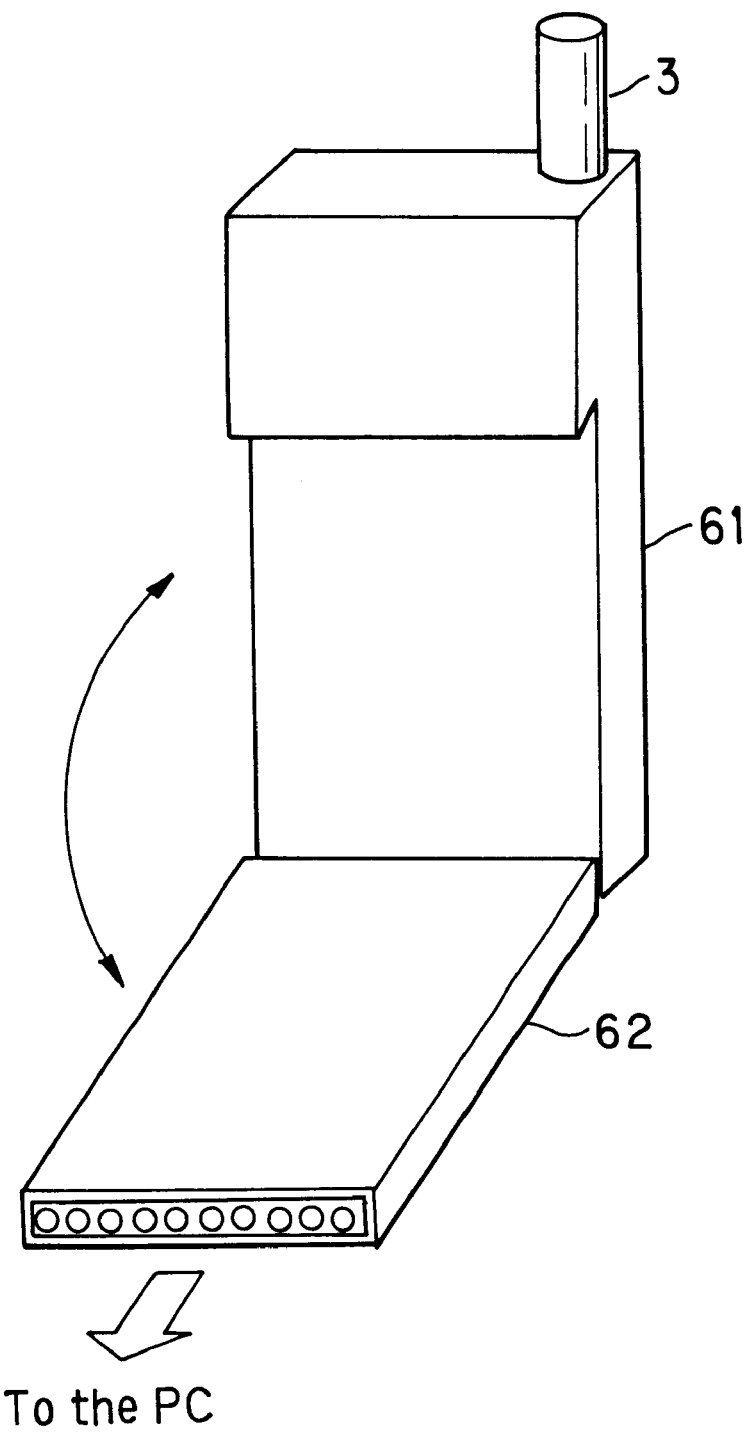
FIG. 8 is a perspective view of a radio unit of portable wireless equipment according to a fifth embodiment of the present invention.
Figure 9:
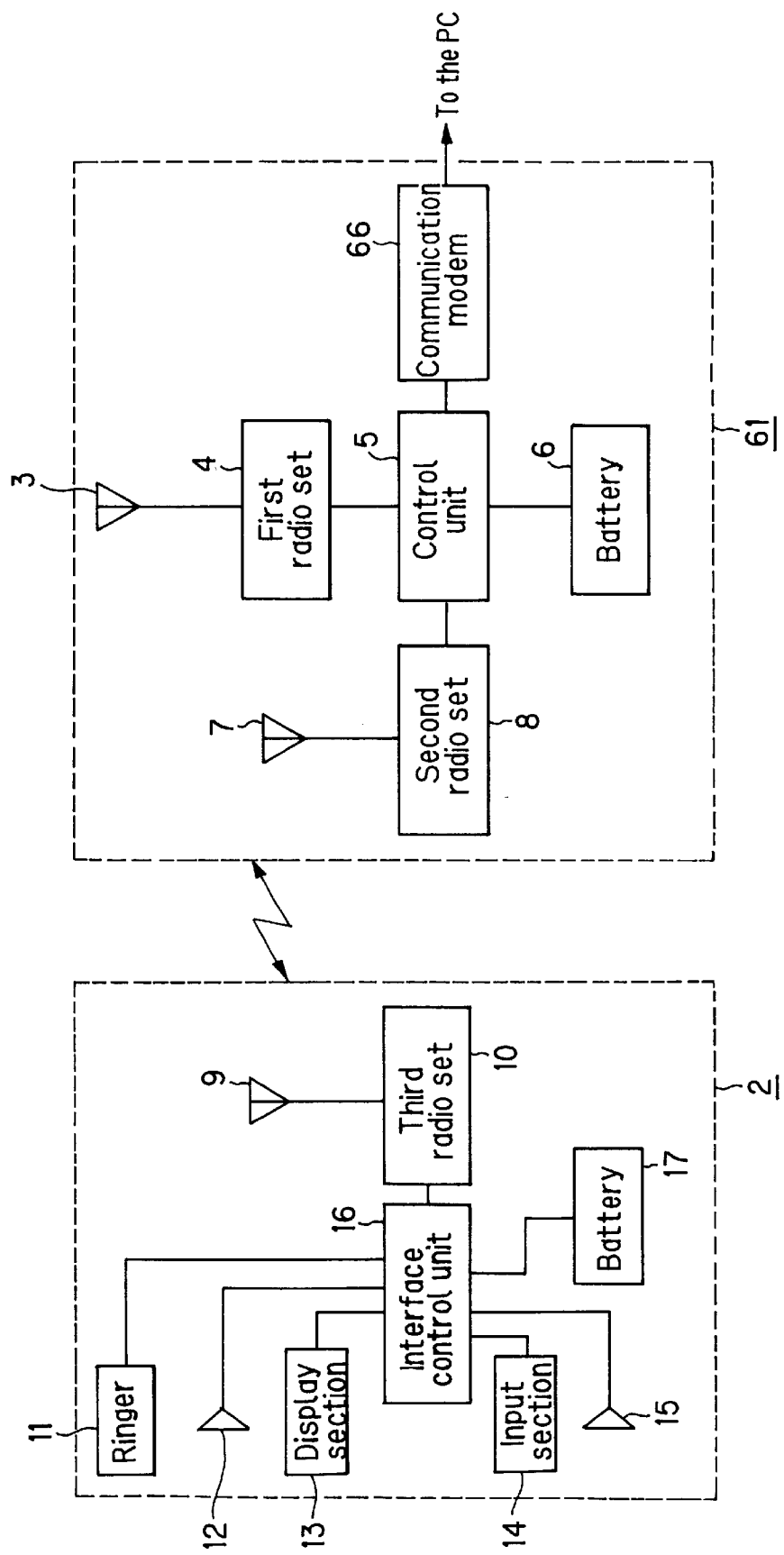
FIG. 9 is a schematic block diagram of a radio unit of portable wireless equipment according to a fifth embodiment of the present invention.

FIG. 8 is a perspective view of a radio unit 61 showing a portable wireless equipment according to a fifth embodiment of the present invention, and FIG. 9 is a schematic block diagram of the radio unit 61 and a user interface unit 2. This embodiment is for making it possible to insert the radio unit in the first and second embodiments into a PC card slot of a notebook type personal computer (PC), TV and the like which can perform image and data processing and display images and data. The same construction as that of the above embodiments is denoted by the same reference numeral and the description thereof is omitted.

As shown in FIG. 9, the radio unit 61 has a first radio set 4 for performing radio communications with an unillustrated base station, a first antenna 3 connected to the first radio set 4, a second radio set 8 for performing radio communications with the user interface unit (not shown) with slight or certain small power, a second antenna 7 connected to the second radio set 8, a control unit 5 constituted by a CPU, a memory and the like, for controlling the first and second radio sets 4, 8, a communication modem section 66 connected to the control unit 5 and a first battery 6 for driving the control unit 5, the first and second radio sets 4, 8 and the communication modem section 66.

Figure 1:
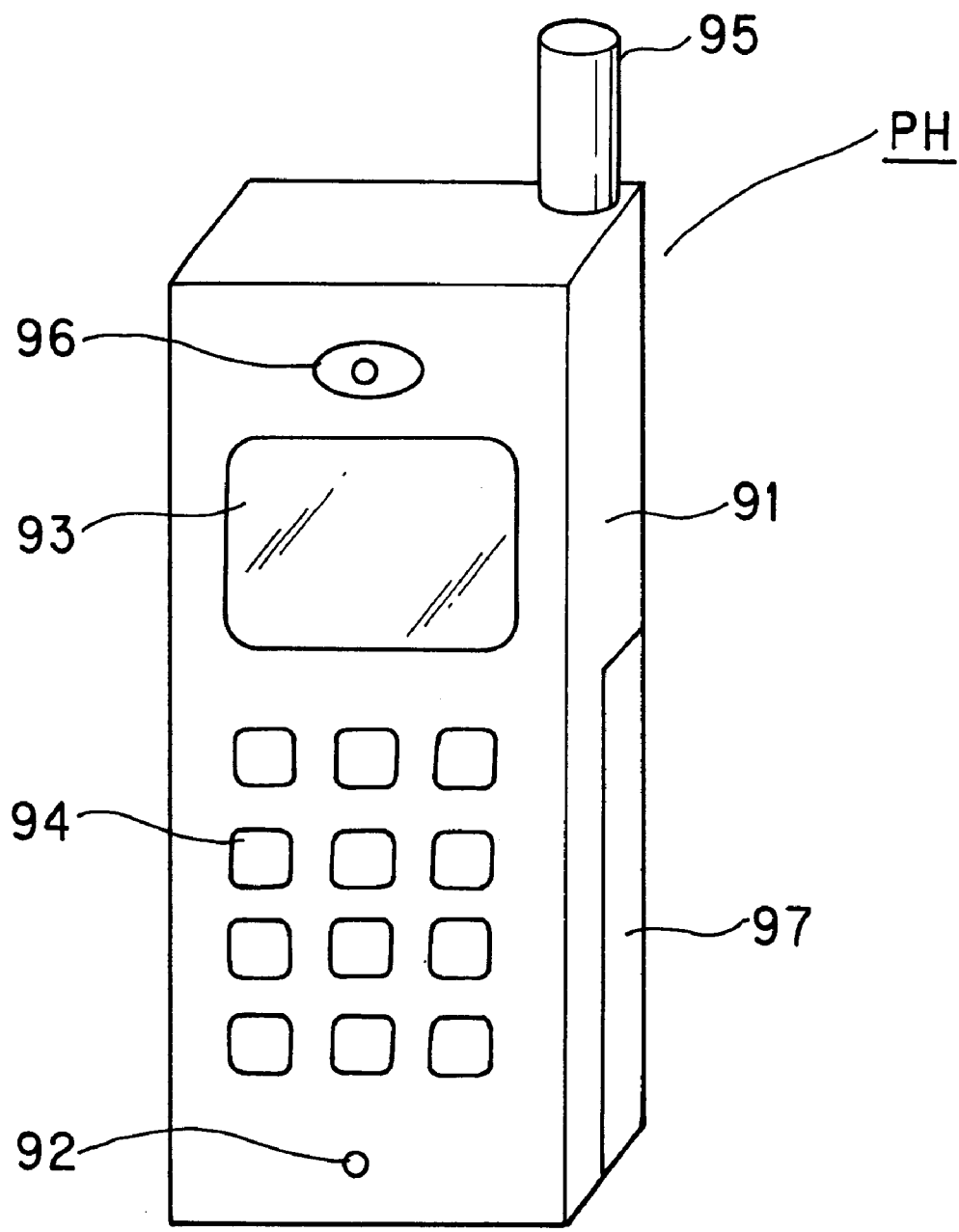
FIG. 1 is a perspective view showing a conventional portable wireless equipment.
Figure 2:
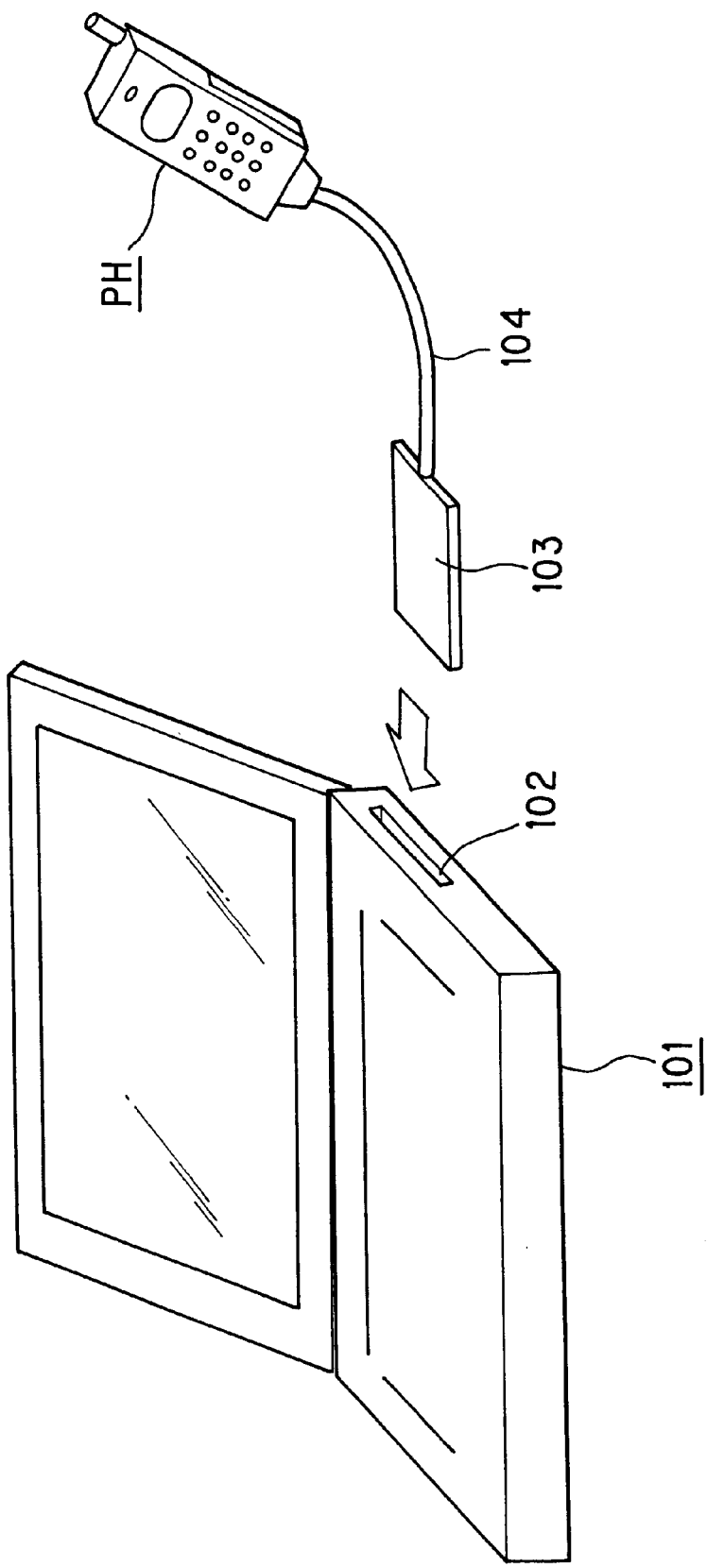
FIG. 2 is a perspective view showing the situation of data communication using a conventional portable wireless equipment.

The communication modem section 66 is, as shown in FIG. 8, built in a freely opened/closed flip portion 62 in a card shape by means of an axis of rotation in the horizontal direction provided at the lower end on the front face of the radio unit 61, and by making the flip portion 62 open from the radio unit 61, it can be inserted into the PC card slot (see FIG. 2) of a notebook type personal computer or the like.

Moreover, in the state that the flip portion 62 of the radio unit 61 is closed, the radio unit 61 has approximately the same attachment face as that of the user interface unit 2 (FIG. 4), and can be used by being combined with the user interface unit 2 as a normal portable telephone (FIG. 9).

Therefore, as shown in FIG. 9, of the signals received by the first radio set 4, first classification signals which can be output by the user interface unit, such as voice, call-in and call-out signals, dial data and the like are communicated with the user interface unit 2 via the second radio set 8 and the second antenna 7 selected by the control unit 5.

On the other hand, second classification signals which can be output by a computer display, TV or the like, such as data, images or the like are transmitted to the PC via the communication modem section 66 selected by the control unit 5.

According to this embodiment, when data and image communications are performed by the PC or the like, the user interface unit 2 is independently provided relative to the radio unit 61 fixed to the PC, so that radio communication is possible with slight or certain small power radio. Hence, communication control and voice transmission/reception can be operated by using the user interface unit 2 at hand, and the operability is not deteriorated even at the time of data communication.

Moreover, it is more preferable when the data and voice are transmitted or received at the same time by using a multicall or the like, and a normal voice call becomes possible by using the user interface unit, while watching the data on the PC.

In addition, the first classification signals may be controlled by the PC via the communication modem section 66, in the same manner as the second classification signals.

Figure 10:
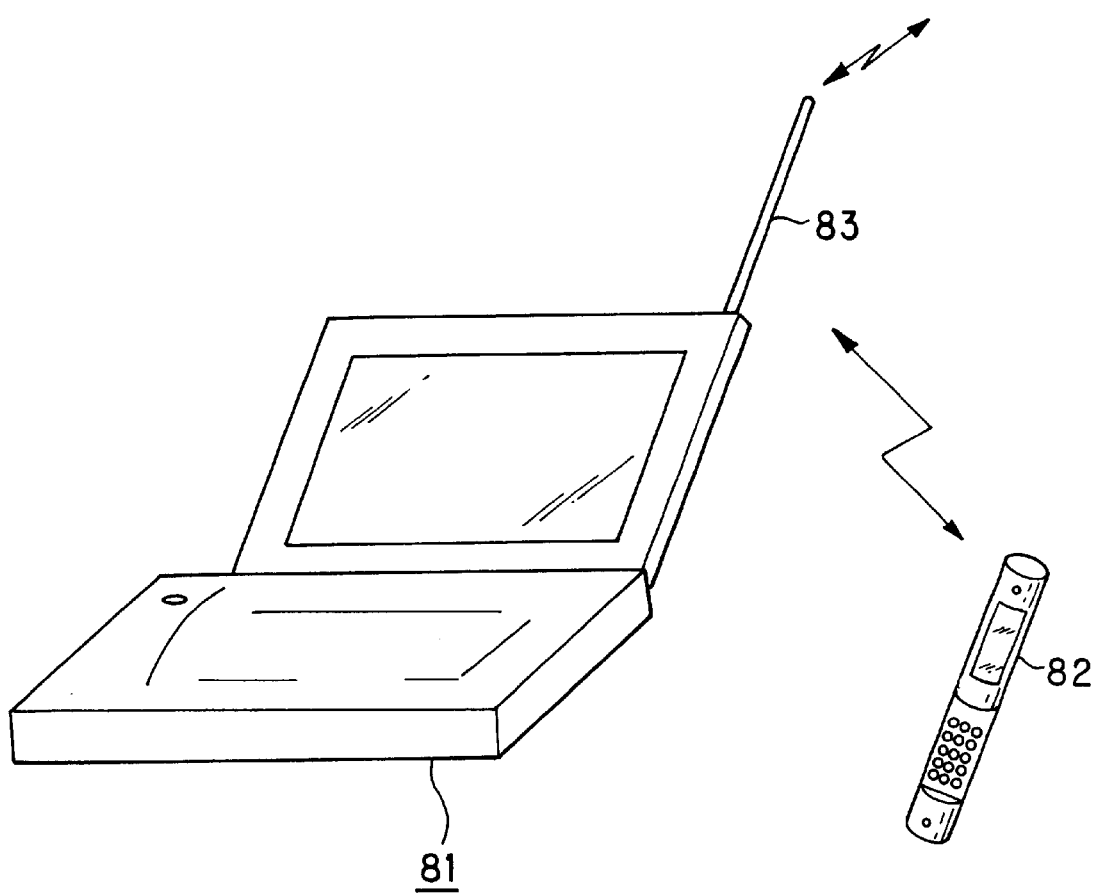
FIG. 10 is a perspective view of a portable wireless equipment according to a sixth embodiment of the present invention.

FIG. 10 is a perspective view of a portable wireless equipment according to a sixth embodiment of the present invention.

The portable wireless equipment of FIG. 10 is such that in the above-described fifth embodiment, the radio unit 61 is built in a PC (image data communication terminal) capable of image/data processing beforehand. The portable wireless equipment of FIG. 10 is built in the image data communication terminal 81 beforehand, and has a radio unit for communicating with the base station and a first antenna section 83.

Voice calls and communication operations such as call-in and call-out can be performed both by the user interface unit 82 and the image data communication terminal 81, and the data, image and the like are displayed by the image data communication terminal 81. In addition, as in the above-described embodiment, the user interface unit 82 and the image data communication terminal 81 are connected by radio communications with slight or certain small power. The user interface unit 82 has the similar construction to that of the user interface unit 32.

According to the portable wireless equipment of this embodiment, a user who communicates only images and data such as WWW (World Wide Web) very often can communicate by radio with only the image data communication terminal 81, and it is not necessary to connect a radio unit or the like separately for communications.

Moreover, at the time of a voice call, by using the user interface unit 82 as in the above-described embodiment, it is not necessary to connect an earphone microphone jack or the like, thus improving the operability.

As described above, according to the first gist, since the portable wireless equipment is made separable between the radio unit section and the user interface unit section, the operation section which is operated by an operator by hand becomes only the user interface unit section, hence this section becomes smaller than the conventional portable wireless equipment, improving the portability.

Particularly, by separating the user interface unit section which does not require large power from the radio unit section, the second power supply section in the user interface unit section which is operated by a user by hand can be made less powerful and smaller than the first power supply section in the radio unit section which requires large power, enabling to make the user interface unit section small, thin and lightweight.

Moreover, since a high-performance radio set required for communications with the base station is not necessary between the radio unit section and the user interface unit section which communicate by radio in a short distance, the third radio communication section which performs radio communications with less power than the first radio communication section (uses the second power supply section) is provided in the user interface unit section. Hence, it becomes possible to make the user interface unit section small, thin and lightweight, while ensuring the radio communication function.

As described above, the small-sized user interface unit section which is actually operated by the operator can be made small, thin and lightweight which can be used, for example, for operation or for transmission and reception, or can be carried in a chest pocket, hence it becomes possible to provide a portable wireless equipment desired by the operator.

Moreover, by separating the radio unit section and the user interface unit section for radio communications, the first radio unit section having a high-performance antenna which is essential for high quality radio communications with the base station is not put close to the head of a human body at the time of conversation, hence a high-performance antenna can be realized at the time of actual use.

Meanwhile, even when the first power supply section in the radio unit section is made to have a large capacity for longer use, though the radio unit section carried in a bag or the like is made slightly bigger, the size of the user interface unit section which is actually used does not change, hence the portability is not impaired.

According to the second gist, the radio unit section and the user interface unit section are detachably constructed, hence usage of the portable wireless equipment as a normal portable wireless equipment and a selective application mode become possible, thereby improving the handleability.

According to the third gist, when the voice and data or an image are communicated at the same time, it becomes possible to communicate while watching the images and data of the image processing apparatus connected to the radio unit section, during conversation using the user interface unit section.

According to the fourth or fifth gist, when the radio unit section and the user interface unit section are combined into one, the first and second contact portions are connected, hence a selective application mode becomes possible to use it as a normal portable wireless equipment or to use it by separating them, thereby improving the handleability.

According to the sixth or seventh gist, the first and second contact portions include a power supply line, and when the radio unit section and the user interface unit section are combined into one, the user interface unit section is driven by the first power supply section, thereby the consumption of the second power supply section having small power can be suppressed at the time of being combined.

According to the eighth or ninth gist, the first and second contact portions include a power supply line, and when the radio unit section and the user interface unit section are combined into one, the second power supply section is charged by the first power supply section, thereby the power consumption of the second power supply section having small power can be supplemented.

According to the tenth or eleventh gist, the radio unit section is built in the image data processing apparatus beforehand, hence voice and data or images can be communicated at the same time, and it becomes also possible to communicate while watching the data or image displayed on an image data communication section, during conversation using the user interface unit section, without using an earphone jack or the like.

What is claimed is:

1. A portable wireless equipment, comprising:
    a portable radio unit section for performing radio communication information with a base station; and
    a portable user interface unit section comprising an input/output interface used for the radio communications by an operator, wherein
        said portable radio unit section comprises a first radio communication section used for radio communications with the base station, a second radio communication section used for radio communications with said user portable interface unit section, a radio unit control section for controlling said first and second radio communication sections, and a first power supply section for driving said radio unit section,
        said portable user interface unit section comprises a third radio communication section used for radio communications with said portable radio unit section, with less power than said first radio communication section, a user interface unit control section for controlling said third radio communication section and said input/output interface, and a second power supply section for driving said portable user interface section, using less power or being smaller than said first power supply section, and
        said portable user interface unit section being capable of being separated from said portable radio unit section for performing radio communications.

2. A portable wireless equipment according to claim 1, wherein said portable radio unit section and said portable user interface unit section are detachable.

3. A portable wireless equipment according to claim 1, wherein said portable radio unit section has a communication modem capable of connecting the portable radio unit section with an image data processing apparatus which can display images or data.

4. A portable wireless equipment according to claim 1, wherein said portable radio unit section has a first electric contact portion, and said portable user interface unit section has also a second electric contact portion, and when said portable radio unit section and said portable user interface unit section are combined into one, said first and second contact portions are connected.

5. A portable wireless equipment according to claim 3, wherein said portable radio unit section has a first electric contact portion, and said portable user interface unit section has also a second electric contact portion, and when said portable radio unit section and said portable user interface unit section are combined into one, said first and second contact portions are connected.

6. A portable wireless equipment according to claim 4, wherein said first and second contact portions include a power supply line, and when said portable radio unit section and said portable user interface unit section are combined into one, said portable user interface unit section is driven by said first power supply section.

7. A portable wireless equipment according to claim 5, wherein said first and second contact portions include a power supply line, and when said portable radio unit section and said portable user interface unit section are combined into one, said portable user interface unit section is driven by said first power supply section.

8. A portable wireless equipment according to claim 4, wherein said first and second contact portions include a power supply line, and when said portable radio unit section and said portable user interface unit section are combined into one, said second power supply section is charged by said first power supply section.

9. A portable wireless equipment according to claim 5, wherein said first and second contact portions include a power supply line, and when said portable radio unit section and said portable user interface unit section are combined into one, said second power supply section is charged by said first power supply section.

10. A portable wireless equipment according to claim 1, wherein said portable radio unit section is built in an image data processing apparatus beforehand, which can display an image or data.

11. A portable wireless equipment according to claim 3, wherein said portable radio unit section is built in an image data processing apparatus beforehand, which can display an image or data.

12. A portable radio communication apparatus, comprising:
    a portable radio unit; and a portable user interface, wherein
the portable user interface unit is configured for selective attachment to and detachment from the portable radio unit and comprises a user operable data input section, a display section, a microphone, a speaker and an antenna for radio communication with the portable radio unit, and
the portable radio unit has no user operable input section and comprises a first antenna for radio communication with the portable user interface unit and a second antenna for radio communication with a base station of a radio telecommunication network.

13. The portable radio communication apparatus according to claim 12, wherein the portable user interface unit and the portable radio unit are each generally box-shaped.

14. The portable radio communication apparatus according to claim 12, wherein the portable radio unit further comprises a modem.

15. The portable radio communication apparatus according to claim 14, wherein a housing of the portable radio unit comprises a flip portion hinged thereto and movable between an open and closed position, the flip portion being adapted for insertion into a slot of an image data processing system when moved to the open position so that data can be communicated between the portable radio unit and the image data processing system via the modem.

16. A portable radio communication apparatus, comprising:
a portable radio unit; and
a portable user interface unit, wherein
the portable radio unit comprises a first antenna for radio communication with a base station of a radio telecommunication network and a second antenna for radio communication with the portable user interface unit,
the portable user interface unit is configured for selective attachment to and detachment from the portable radio unit and comprises a user operable data input section, a display section, a microphone, a speaker and an antenna for radio communication with the portable radio unit,
the apparatus is operable in a first configuration in which the portable user interface unit and the portable radio unit are attached and in a second configuration in which the portable user interface unit and the portable radio unit are detached, and
the antenna of the portable user interface unit and the second antenna of the portable radio unit are built into the portable user interface unit and the portable radio unit, respectively, so that when the apparatus is operated in the first configuration, the portable user interface unit and the portable radio unit are electrically connected via electromagnetic coupling.

17. The portable radio communication apparatus according to claim 16, wherein the portable user interface unit and the portable radio unit are each generally box-shaped.

18. The portable radio communication apparatus according to claim 16, wherein the portable radio unit further comprises a modem.

19. The portable radio communication apparatus according to claim 18, wherein a housing of the portable radio unit comprises a flip portion hinged thereto and movable between an open and closed position, the flip portion being adapted for insertion into a slot of an image data processing system when moved to the open position so that data can be communicated between the portable radio unit and the image data processing system via the modem.

20. The portable radio communication apparatus according to claim 16, wherein the portable radio unit has no user operable data input section.

21. A portable radio communication apparatus, comprising:
a portable radio unit; and
a portable user interface unit, wherein
the portable user interface unit has a substantially circular cross-section and comprises a user operable input section, a display section, a microphone, a speaker and an antenna for radio communication with the portable radio unit, and
the portable radio unit has a curved portion for receiving the portable user interface unit and comprises a first antenna for radio communication with the portable user interface unit and a second antenna for radio communication with a base station of a radio telecommunication network.

22. The portable radio communication apparatus according to claim 21, wherein the apparatus is operable in a first configuration in which the portable user interface unit and the portable radio unit are attached and in a second configuration in which the portable user interface unit and the portable radio unit are detached.

23. The portable radio communication apparatus according to claim 21, wherein the portable user interface unit comprises a battery compartment having a longitudinal axis aligned with the longitudinal axis of the portable user interface unit.

24. The portable radio communication apparatus according to claim 21, wherein the portable radio unit has no user operable data input section.

25. A portable radio communication apparatus, comprising:
a portable radio unit; and
a portable user interface unit, wherein
the portable radio unit comprises a first antenna for radio communication with a base station of a radio telecommunication network, a second antenna for radio communication with the portable user interface unit, and an electric contact portion,
the portable user interface unit is configured for selective attachment to and detachment from the portable radio unit and comprises a user operable input section, a display section, a microphone, a speaker, an antenna for radio communication with the portable radio unit, and an electric contact portion,
the apparatus is operable in a first configuration in which the portable user interface unit and the portable radio unit are attached and in a second configuration in which the portable user interface unit and the portable radio unit are detached, and
the portable user interface unit and the portable radio unit communicate via the electric contact portions when the apparatus is operated in the first configuration and the portable user interface unit and the portable radio unit communicate via radio communication when the apparatus is operated in the second configuration.

26. The portable radio communication apparatus according to claim 25, wherein the electric contact portions of the portable radio unit and the portable user interface unit each include a power supply line and the portable radio unit powers the portable user interface unit in the first configuration.

27. The portable radio communication apparatus according to claim 25, wherein the electric contact portions of the portable radio unit and the portable user interface unit each include a power supply line and the portable radio unit charges the portable user interface unit in the first configuration.

28. The portable radio communication apparatus according to claim 25, wherein the portable radio unit has no user operable data input section.

29. A portable radio communication apparatus, comprising:

a portable radio unit; and a portable user interface unit, wherein the portable user interface unit is configured for selective attachment to and detachment from the portable radio unit and comprises a user operable data input section, a display section, a microphone, a speaker and radio circuitry for radio communication with the portable radio unit, and the portable radio unit has no user operable data input section and comprises radio circuitry for radio communication with the portable user interface unit and with a base station of a radio telecommunication network.

30. A portable radio communication apparatus, comprising:

a portable radio unit; and a portable user interface unit, wherein the portable user interface unit has a substantially circular cross-section and comprises a user operable input section, a display section, a microphone, a speaker and radio circuitry for radio communication with the portable radio unit, and the portable radio unit has a curved portion for receiving the portable user interface unit and comprises radio circuitry for radio communication with the portable user interface unit and with a base station of a radio telecommunication network.

31. The portable radio communication apparatus according to claim 12, wherein the portable user interface unit and the portable radio unit are both portable.

32. The portable radio communication apparatus according to claim 16, wherein the portable user interface unit and the portable radio unit are both portable.

33. The portable radio communication apparatus according to claim 21, wherein the portable user interface unit and the portable radio unit are both portable.

34. The portable radio communication apparatus according to claim 25, wherein the portable user interface unit and the portable radio unit are both portable.

35. The portable radio communication apparatus according to claim 29, wherein the portable user interface unit and the portable radio unit are both portable.

36. The portable radio communication apparatus according to claim 30, wherein the portable user interface unit and the portable radio unit are both portable.

37. A portable radio communication apparatus, comprising:

a portable radio unit; and a portable user interface unit selectively detachable from the portable radio unit, wherein the portable user interface unit comprises a user operable data input section, a display section, a microphone, a speaker, and radio circuitry for radio communication with the portable radio unit, the portable radio unit comprises radio circuitry for radio communication with a base station of a radio telecommunication network and for radio communication with the portable user interface unit, and when the portable radio unit and the portable user interface unit are detached from each other, the portable user interface unit is usable to place and receive radio telecommunication network calls via first radio communications between the portable user interface unit and the portable radio unit and second radio communications between the portable radio unit and the base station.

* * * * *